United States Patent
Okada et al.

(10) Patent No.: US 10,280,275 B2
(45) Date of Patent: May 7, 2019

(54) IN-SITU FOAMING SYSTEM FOR FORMING FLAME-RETARDANT POLYURETHANE FOAM IN SITU

(71) Applicant: SEKISUI CHEMICAL CO., LTD., Osaka (JP)

(72) Inventors: Yousuke Okada, Saitama (JP); Kazuhiro Okada, Saitama (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/029,797

(22) PCT Filed: Feb. 27, 2015

(86) PCT No.: PCT/JP2015/055791
§ 371 (c)(1),
(2) Date: Apr. 15, 2016

(87) PCT Pub. No.: WO2015/129850
PCT Pub. Date: Sep. 3, 2015

(65) Prior Publication Data
US 2016/0251491 A1   Sep. 1, 2016

(30) Foreign Application Priority Data
Feb. 27, 2014   (JP) ................. 2014-036894

(51) Int. Cl.
*C08J 9/00*   (2006.01)
*C09K 21/02*   (2006.01)
(Continued)

(52) U.S. Cl.
CPC .......... *C08J 9/0066* (2013.01); *C08G 18/092* (2013.01); *C08G 18/163* (2013.01); *C08G 18/1808* (2013.01); *C08G 18/1875* (2013.01); *C08G 18/225* (2013.01); *C08G 18/3206* (2013.01); *C08G 18/341* (2013.01); *C08G 18/4211* (2013.01); *C08G 18/6607* (2013.01); *C08G 18/7671* (2013.01); *C08J 9/0019* (2013.01); *C08J 9/0023* (2013.01); *C08J 9/0038* (2013.01); *C08J 9/0095* (2013.01); *C08J 9/146* (2013.01); *C08K 3/016* (2018.01); *C08K 3/02* (2013.01); *C08K 5/0066* (2013.01); *C08K 5/521* (2013.01); *C09K 21/02* (2013.01); *C09K 21/04* (2013.01); *C09K 21/08* (2013.01); *C09K 21/12* (2013.01); *E04B 1/78* (2013.01); *E04B 1/94* (2013.01); *B60R 13/08* (2013.01); *C08G 2101/0025* (2013.01); *C08G 2101/0058* (2013.01); *C08J 9/144* (2013.01); *C08J 2201/022* (2013.01); *C08J 2203/10* (2013.01); *C08J 2203/142* (2013.01); *C08J 2203/144* (2013.01); *C08J 2203/162* (2013.01); *C08J 2203/182* (2013.01); *C08J 2203/202* (2013.01); *C08J 2207/04* (2013.01); *C08J 2375/06* (2013.01); *C08K 3/2279* (2013.01); *C08K 5/03* (2013.01); *C08K 2003/026* (2013.01); *C08K 2003/2227* (2013.01); *C08K 2003/322* (2013.01); *C08K 2003/387* (2013.01)

(58) Field of Classification Search
CPC ...... B60R 13/08; C08G 18/00; C08G 18/092; C08G 18/16; C08G 18/163; C08G 18/1808; C08G 18/1875; C08G 18/225; C08G 18/3206; C08G 18/341; C08G 18/4211; C08G 18/6607; C08G 18/7671; C08G 2101/0025; C08G 2101/0058; C08J 9/0023; C08J 9/0038; C08J 9/0066; C08J 9/146; C08J 2203/10; C08J 2203/144; C08J 2375/06; C08K 3/0058; C08K 3/0066; C08K 5/521; C08K 2003/026; C08K 21/02; C08K 21/04; C08K 21/08; C08K 21/12; E04B 1/78; E04B 1/94
See application file for complete search history.

(56) References Cited

U.S. PATENT DOCUMENTS 4,575,520 A * 3/1986 Kapps ................ C08G 18/4883
521/107
6,268,402 B1   7/2001 Wilson et al.
(Continued)

FOREIGN PATENT DOCUMENTS

AU   758313   * 6/2000
JP   10-168150   6/1998
(Continued)

OTHER PUBLICATIONS

International Search Report dated May 19, 2015 in corresponding (PCT) Application No. PCT/JP2015/055791.
(Continued)

*Primary Examiner* — John M Cooney
(74) *Attorney, Agent, or Firm* — Wendroth, Lind & Ponack, L.L.P.

(57) ABSTRACT

An in-situ foaming system for forming a flame-retardant polyurethane foam in situ comprising a first liquid containing a polyisocyanate (A), a second liquid containing a polyol (B), a trimerization catalyst (C), a foaming agent (D), a foam stabilizer (E), and additives (F) comprising red phosphorus and at least one member selected from the group consisting of phosphoric acid esters, phosphate-containing flame retardants, bromine-containing flame retardants, boron-containing flame retardants, antimony-containing flame retardants, and metal hydroxides.

6 Claims, 1 Drawing Sheet

(51) Int. Cl.

| | | |
|---|---|---|
| C09K 21/04 | (2006.01) | |
| C09K 21/08 | (2006.01) | |
| C09K 21/12 | (2006.01) | |
| C08G 18/22 | (2006.01) | |
| C08G 18/42 | (2006.01) | |
| C08G 18/34 | (2006.01) | |
| C08G 18/76 | (2006.01) | |
| C08J 9/14 | (2006.01) | |
| E04B 1/78 | (2006.01) | |
| E04B 1/94 | (2006.01) | |
| C08G 18/66 | (2006.01) | |
| C08K 5/00 | (2006.01) | |
| C08G 18/09 | (2006.01) | |
| C08G 18/16 | (2006.01) | |
| C08G 18/18 | (2006.01) | |
| C08G 18/32 | (2006.01) | |
| C08K 5/521 | (2006.01) | |
| C08K 3/02 | (2006.01) | |
| C08K 3/016 | (2018.01) | |
| B60R 13/08 | (2006.01) | |
| C08G 101/00 | (2006.01) | |
| C08K 3/22 | (2006.01) | |
| C08K 5/03 | (2006.01) | |
| C08K 3/32 | (2006.01) | |
| C08K 3/38 | (2006.01) | |

(56) References Cited

U.S. PATENT DOCUMENTS

| | | | | |
|---|---|---|---|---|
| 2003/0092777 | A1 | 5/2003 | Leitner | |
| 2004/0214910 | A1* | 10/2004 | Kluth | C08G 18/10 521/159 |
| 2008/0234402 | A1* | 9/2008 | Lehmann | B01J 31/0204 521/118 |
| 2008/0312351 | A1 | 12/2008 | Burdeniuc et al. | |
| 2010/0010107 | A1* | 1/2010 | Sugimae | C08L 23/02 521/70 |
| 2012/0157558 | A1* | 6/2012 | Schiller | C08G 18/61 521/137 |
| 2013/0225705 | A1 | 8/2013 | Plaver et al. | |
| 2015/0144829 | A1 | 5/2015 | Grünbauer | |
| 2015/0322195 | A1 | 11/2015 | Makida et al. | |

FOREIGN PATENT DOCUMENTS

| | | |
|---|---|---|
| JP | 11-49837 | 2/1999 |
| JP | 2003-201325 | 7/2003 |
| JP | 2005-307143 | 11/2005 |
| JP | 2008/308689 | 12/2008 |
| JP | 2012-219127 | 11/2012 |
| JP | 2013-241537 | 12/2013 |
| JP | 2013-544307 | 12/2013 |
| JP | 2014-196476 | 10/2014 |
| WO | 2013/135746 | 9/2013 |
| WO | 2013/179251 | 12/2013 |
| WO | 2014/112394 | 7/2014 |

OTHER PUBLICATIONS

Extended European Search Report dated Oct. 13, 2017 in European Patent Application No. 15755081.5.

Notification of Reasons for Refusal dated Nov. 14, 2017 in Japanese patent Application No. 2015-516345, with English-language translation.

* cited by examiner

IN-SITU FOAMING SYSTEM FOR FORMING FLAME-RETARDANT POLYURETHANE FOAM IN SITU

CROSS REFERENCE OF RELATED FIELD

This application claims priority to JP2014-036894A, filed Feb. 27, 2014, the disclosure of which is incorporated herein by reference in its entirety.

TECHNICAL FIELD

The present invention relates to an in-situ foaming system for forming a flame-retardant polyurethane foam in situ.

BACKGROUND ART

Openings or gaps in interior or exterior walls of a building, such as joint portions or holes, are covered by mortar, a sealant, or a foaming agent, for the purpose of satisfying at least one of water resistance, fire resistance, and sound insulation.

As an example of the above, Patent Literature (PTL) 1 discloses a two-component aerosol-type flame-retardant polyisocyanurate foam, characterized in that an isocyanate component that comprises an organic polyisocyanate and a propellant as main components and that is inserted in an aerosol can is reacted with a polyol component that comprises a polyol, a trimerization catalyst, and a propellant as main components and that is inserted in another aerosol can, so as to achieve the equivalent ratio of NCO/OH of 1.5 to 5.0. Also, Patent Literature (PTL) 2 discloses a multi-component, on-site foaming system for producing polyurethane foams on site for building purposes, with a polyisocyanate component (A) and a polyol component (B), which are in separate containers, wherein, aside from the polyisocyanate component (A) and the polyol component (B), further components (C) and (D) are contained in a spatially separate form, with the components, upon being mixed, forming an interpenetrating polymeric network of foamed polyurethane and at least one further polymer.

CITATION LIST

Patent Literature

PTL 1: JPH11-049837A
PTL 2: JP2003-201325A

SUMMARY OF INVENTION

Technical Problem

However, the production of the foam of PTL 1 requires a large-scale aerosol apparatus, which is unsuitable for repairing tiny openings or gaps in situ. Further, the urethane foam of PTL 2 can be formed in situ, but the obtained urethane foam has insufficient fire resistance.

An object of the present invention is to provide an in-situ foaming system for forming a polyurethane foam having excellent flame retardancy in situ.

Solution to Problem

The present inventors found that a polyurethane foam having excellent flame retardancy is formed in situ with the use of a system in which a first liquid containing a polyisocyanate and a second liquid containing a polyol, which are placed in separate containers, are further reacted with a foaming agent, a trimerization catalyst, and additives, the additives comprising red phosphorus and at least one member selected from the group consisting of phosphoric acid esters, phosphate-containing flame retardants, bromine-containing flame retardants, boron-containing flame retardants, antimony-containing flame retardants, and metal hydroxides. The present invention has thus been accomplished.

More specifically, the following describes the present invention:

Item 1. An in-situ foaming system for forming a flame-retardant polyurethane foam in situ comprising:
a first liquid containing a polyisocyanate (A);
a second liquid containing a polyol (B);
a trimerization catalyst (C);
a foaming agent (D);
a foam stabilizer (E); and
additives (F) comprising red phosphorus and at least one member selected from the group consisting of phosphoric acid esters, phosphate-containing flame retardants, bromine-containing flame retardants, boron-containing flame retardants, antimony-containing flame retardants, metal hydroxides and needle-shaped fillers.

Item 2. The in-situ foaming system according to Item 1, wherein the trimerization catalyst (C) is contained in an amount within a range of 0.1 to 10 parts by weight,
the foaming agent (D) is contained in an amount within a range of 0.1 to 30 parts by weight,
the foam stabilizer (E) is contained in an amount within a range of 0.1 to 10 parts by weight,
the additives (F) are contained in an amount within a range of 4.5 to 70 parts by weight,
the red phosphorus is contained in an amount within a range of 3 to 18 parts by weight, and
at least one additive other than the red phosphorus is contained in an amount within a range of 1.5 to 52 parts by weight, based on 100 parts by weight of the polyurethane resin composition comprising the polyisocyanate (A) of the first liquid and the polyol (B) of the second liquid.

Item 3. The in-situ foaming system according to Item 2, wherein the in-situ forming system further comprises a foam stabilizer in an amount within a range of 0.1 to 10 parts by weight, based on 100 parts by weight of the urethane resin composition.

Item 4. The in-situ foaming system according to Item 1, wherein the first liquid containing the polyisocyanate (A) is contained in a first container; and
the second liquid containing the polyol (B) is contained in a second container, the second liquid further containing the trimerization catalyst (C), the foaming agent (D), the foam stabilizer (E), and the additives (F).

Item 5. A flame-retardant polyurethane foam for openings or gaps of a building, the flame-retardant polyurethane foam being formed from a flame-retardant polyurethane resin composition comprising:
a first liquid containing a polyisocyanate (A);
a second liquid containing a polyol (B);
a trimerization catalyst (C);
a foaming agent (D);
a foam stabilizer (E); and
additives (F) comprising red phosphorus and at least one member selected from the group consisting of phosphoric acid esters, phosphate-containing flame retardants, bromine-containing flame retardants, boron-containing flame retardants, antimony-containing flame retardants, metal hydroxides and needle-shaped fillers.

Item 6. The flame-retardant polyurethane foam for openings or gaps of a building according to Item 5, wherein
the trimerization catalyst (C) is contained within a range of 0.1 to 10 parts by weight,
the foaming agent (D) is contained within a range of 0.1 to 30 parts by weight,
the foam stabilizer (E) is contained within a range of 0.1 to 10 parts by weight,
the additives (F) is contained within a range of 4.5 to 70 parts by weight,
the red phosphorus is contained within a range of 3 to 18 parts by weight, and
at least one additive other than the red phosphorus is contained within a range of 1.5 to 52 parts by weight,
based on 100 parts by weight of the polyurethane resin composition comprising the polyisocyanate (A) of the first liquid and the polyol (B) of the second liquid.

Item 7. Use of the flame-retardant polyurethane foam of Item 5 or 6 as a heat-insulating material for vehicles or buildings.

Advantageous Effects of Invention

The present invention is capable of forming a polyurethane foam having excellent flame retardancy in situ.

DESCRIPTION OF EMBODIMENTS

As used in the specification, the singular forms ("a," "an," and "the") include the plural unless otherwise specified separately, or unless the context clearly dictates otherwise.

The present invention encompasses an in-situ foaming system for forming a flame-retardant polyurethane foam for building purposes in situ comprising: a first liquid containing a polyisocyanate (A), a second liquid containing a polyol (B), a trimerization catalyst (C), a foaming agent (D), a foam stabilizer (E), and additives (F) comprising red phosphorus and at least one member selected from the group consisting of phosphoric acid esters, phosphate-containing flame retardants, bromine-containing flame retardants, boron-containing flame retardants, antimony-containing flame retardants, and metal hydroxides.

The components (A) to (F) above are mixed to form a flame-retardant polyurethane resin composition, which is then cured to yield a flame-retardant polyurethane foam.

(A) Polyisocyanate

Examples of the polyisocyanate as the main component of urethane resin include aromatic polyisocyanates, alicyclic polyisocyanates, aliphatic polyisocyanates, and the like.

Examples of aromatic polyisocyanates include phenylene diisocyanate, tolylene diisocyanate, xylylene diisocyanate, diphenylmethane diisocyanate, dimethyldiphenylmethane diisocyanate, triphenylmethane triisocyanate, naphthalene diisocyanate, polymethylene polyphenyl polyisocyanate, and the like.

Examples of alicyclic polyisocyanates include cyclohexylene diisocyanate, methylcyclohexylene diisocyanate, isophorone diisocyanate, dicyclohexylmethane diisocyanate, dimethyldicyclohexylmethane diisocyanate, and the like.

Examples of aliphatic polyisocyanates include methylene diisocyanate, ethylene diisocyanate, propylene diisocyanate, tetramethylene diisocyanate, hexamethylene diisocyanate, and the like.

The polyisocyanates may be used alone or in a combination of two or more. The main component of urethane resin is preferably polymethylene polyphenyl polyisocyanate because it is, for example, easy to use and readily available.

(B) Polyol

Examples of the polyol as a curing agent for urethane resin, include polylactone polyols, polycarbonate polyols, aromatic polyols, alicyclic polyols, aliphatic polyols, polyester polyols, polymeric polyols, polyether polyols, and the like.

Examples of polylactone polyols include polypropiolactone glycol, polycaprolactone glycol, polyvalerolactone glycol, and the like.

Examples of polycarbonate polyols include polyols obtained by dealcoholization reaction of hydroxyl-containing compounds, such as ethylene glycol, propylene glycol, butanediol, pentanediol, hexanediol, octanediol, and nonanediol, with diethylene carbonate, dipropylene carbonate, and the like.

Examples of aromatic polyols include bisphenol A, bisphenol F, phenol novolac, cresol novolac, and the like.

Examples of alicyclic polyols include cyclohexane diol, methylcyclohexane diol, isophorone diol, dicyclohexylmethane diol, dimethyldicyclohexylmethane diol, and the like.

Examples of aliphatic polyols include ethylene glycol, propylene glycol, butanediol, pentanediol, hexanediol, and the like.

Examples of polyester polyols include polymers obtained by dehydration condensation of polybasic acids with polyhydric alcohols; polymers obtained by ring-opening polymerization of a lactone, such as ε-caprolactone or α-methyl-ε-caprolactone; and condensation products of hydroxy carboxylic acids with the polyhydric alcohols mentioned above and the like.

Specific examples of polybasic acids as used herein include adipic acid, azelaic acid, sebacic acid, terephthalic acid, isophthalic acid, succinic acid, and the like. Specific examples of polyhydric alcohols include bisphenol A, ethylene glycol, 1,2-propylene glycol, 1,4-butanediol, diethylene glycol, 1,6-hexane glycol, neopentyl glycol, and the like.

Specific examples of hydroxy carboxylic acids include castor oil; reaction products of castor oil with ethylene glycol; and the like.

Examples of polymeric polyols include polymers obtained by graft polymerization of aromatic polyols, alicyclic polyols, aliphatic polyols, and polyester polyols with ethylenically unsaturated compounds, such as acrylonitrile, styrene, methyl acrylate, and methacrylate; polybutadiene polyol; modified polyols of polyhydric alcohols; hydrogenated products thereof; and the like.

Examples of modified polyols of polyhydric alcohols include, for example, those obtained by modifying a polyhydric alcohol used as a starting material by reacting it with an alkylene oxide.

Examples of polyhydric alcohols include trihydric alcohols, such as glycerin and trimethylolpropane; tetra- to octahydric alcohols, such as pentaerythritol, sorbitol, mannitol, sorbitan, diglycerol, dipentaerythritol and the like, cane sugar, glucose, mannose, fructose, methyl glucoside, and derivatives thereof; phenols such as phenol, phloroglucin, cresol, pyrogallol, catechol, hydroquinone, bisphenol A, bisphenol F, bisphenol S, 1-hydroxynaphthalene, 1,3,6,8-tetrahydroxynaphthalene, anthrol, 1,4,5,8-tetrahydroxyanthracene, and 1-hydroxypyrene; polybutadiene polyols; castor oil polyols; multi-functional polyols (e.g., 2 to 100 functional groups), such as (co)polymers of hydroxyalkyl (meth)acrylate and polyvinyl alcohols; and condensation products (novolak) of phenol with formaldehyde.

The method for modifying a polyhydric alcohol is not particularly limited. A method of adding alkylene oxide ("AO") to a polyhydric alcohol is preferably used.

Examples of AO include AO having 2 to 6 carbon atoms, such as ethylene oxide ("EO"), 1,2-propylene oxide ("PO"), 1,3-propylene oxide, 1,2-butylene oxide, and 1,4-butylene oxide. Of these, PO, EO, and 1,2-butylene oxide are preferable, and PO and EO are more preferable, from the viewpoint of their characteristics and reactivity. When two or more types of AOs (e.g., PO and EO) are used, they may be added in the block and/or random polymer form.

Examples of polyether polyols include polymers obtained by subjecting at least one member of alkylene oxides, such as ethylene oxide, propylene oxide, tetrahydrofuran, to ring-opening polymerization in the presence of at least one member of, for example, low-molecular-weight active hydrogen compounds having two or more active hydrogen atoms.

Examples of low-molecular-weight active hydrogen compounds having two or more active hydrogen atoms include diols, such as bisphenol A, ethylene glycol, propylene glycol, butylene glycol, and 1,6-hexanediol; triols, such as glycerin and trimethylolpropane; amines, such as ethylenediamine and butylenediamine; and the like.

The polyol used in the present invention is preferably a polyester polyol or a polyether polyol because they greatly contribute to reduce the gross calorific value at the time of combustion.

Of these, it is more preferable to use a polyester polyol having a molecular weight of 200 to 800, and it is still more preferable to use a polyester polyol having a molecular weight of 300 to 500.

The following describes the amount ratio between the main component and the curing agent of the urethane resin.

In the present invention, an index is defined as (the number of equivalents of polyisocyanate)×100/(the number of equivalents of polyol+the number of equivalents of water). Here, the number of equivalents of polyol compound is calculated as [the polyol compound hydroxyl value (mg KOH/g)]×[polyol compound weight (g)]/[potassium hydroxide molecular weight].

The number of equivalents of polyisocyanate is calculated as [the polyisocyanate group molecular weight]×100/[isocyanate group (wt %)].

The number of equivalents of water is calculated as [water weight (g)]×2/[water molecular weight].

An isocyanate index is the percentage of the equivalent ratio of isocyanate groups of polyisocyanate to polyol hydroxyl groups. The value exceeding 100 indicates that the amount of isocyanate groups is greater than the amount of hydroxyl groups.

The isocyanate index of the urethane resin used in the present invention is preferably in the range of 120 to 700, more preferably 200 to 600, and still more preferably 300 to 500. When the equivalent ratio is 700 or less, failure in the formation of foam is avoided. When the equivalent ratio is 120 or more, excellent heat resistance is achieved.

(C) Trimerization Catalyst

A trimerization catalyst reacts with isocyanate groups of polyisocyanate, i.e., the main component of polyurethane resin, to achieve trimerization of the isocyanates, leading to the formation of isocyanurate rings.

Examples of trimerization catalysts used to facilitate the formation of isocyanurate rings include nitrogen-containing aromatic compounds, such as tris(dimethylaminomethyl)phenol, 2,4-bis(dimethylaminomethyl)phenol, and 2,4,6-tris(dialkylaminoalkyl)hexahydro-S-triazine;
carboxylic acid alkali metal salts, such as potassium acetate and potassium octylate;
tertiary ammonium salts, such as trimethyl ammonium salt, triethyl ammonium salt, and triphenyl ammonium salt;
quaternary ammonium salts, such as tetramethyl ammonium salt, tetraethyl ammonium salt, and tetraphenyl ammonium salt; and the like.

The amount of the trimerization catalyst used in the in-situ foaming system is preferably within a range of 0.1 to 10 parts by weight, more preferably 0.1 to 8 parts by weight, still more preferably 0.1 to 6 parts by weight, and most preferably 0.4 to 3.0 parts by weight, based on 100 parts by weight of the urethane resin. An amount of 0.1 parts by weight or more eliminates a failure of hindering the isocyanate trimerization, while an amount of 10 parts by weight or less maintains an appropriate foaming rate, enabling easy handling.

(D) Foaming Agent

The foaming agent used in the in-situ foaming system promotes the foaming of urethane resin.

Examples of foaming agents include:
water;
low-boiling hydrocarbons, such as propane, butane, pentane, hexane, heptane, cyclopropane, cyclobutane, cyclopentane, cyclohexane, and cycloheptane;
chlorinated aliphatic hydrocarbon compounds, such as dichloroethane, propylchloride, isopropylchloride, butylchloride, isobutylchloride, pentylchloride, and isopentylchloride;
fluorine compounds, such as trichloromonofluoromethane, trichlorotrifluoroethane, $CHF_3$, $CH_2F_2$, $CH_3F$, and hydrofluoroolefin (HFO), e.g., trans-1-chloro-3,3,3-trifluoropropene;
hydrochlorofluorocarbon compounds, such as dichloromonofluoroethane (e.g., HCFC141b (1,1-dichloro-1-fluoroethane)), HCFC22 (chlorodifluoromethane), and HCFC142b (1-chloro-1,1-difluoroethane);
hydrofluorocarbon compounds, such as HFC-245fa (1,1,1,3,3-pentafluoropropane) and HFC-365mfc (1,1,1,3,3-pentafluorobutane); ether compounds, such as diisopropyl ether;
organic physical foaming agents, such as mixtures of these compounds;
inorganic physical foaming agents, such as nitrogen gas, oxygen gas, argon gas, and carbon dioxide gas;
and the like.

The amount of the foaming agent is preferably within a range of 0.1 to 30 parts by weight, based on 100 parts by weight of the urethane resin. The amount of the foaming agent is more preferably within a range of 0.1 to 18 parts by weight, still more preferably 0.5 to 18 parts by weight, and most preferably 1 to 15 parts by weight, based on 100 parts by weight of the urethane resin.

When the range of the foaming agent is 0.1 parts by weight or more, the foaming is promoted, which reduces the density of the obtained molded product. When the range is 30 parts by weight or less, a failure in the formation of foam is avoided.

(E) Foam Stabilizer

Examples of foam stabilizers include surfactants, such as polyoxyalkylene foam stabilizers such as polyoxyalkylene alkyl ether, and silicone foam stabilizers such as organopolysiloxane.

The amount of the foam stabilizer used for the urethane resin, which is cured by a chemical reaction, is suitably set according to the urethane resin used. As one example, the range is preferably, for example, 0.1 to 10 parts by weight, based on 100 parts by weight of the urethane resin.

The trimerization catalysts, foaming agents, and foam stabilizers may each be used alone or in a combination of two or more.

(F) Additives

The additives comprise red phosphorus and at least one member selected from the group consisting of phosphoric acid esters, phosphate-containing flame retardants, bromine-containing flame retardants, boron-containing flame retardants, antimony-containing flame retardants, metal hydroxides and needle-shaped fillers.

In this case, examples of preferable combinations of usable additives include the following (a) to (n).

(a) Red phosphorus and a phosphoric acid ester
(b) Red phosphorus and a phosphate-containing flame retardant
(c) Red phosphorus and a bromine-containing flame retardant
(d) Red phosphorus and a boron-containing flame retardant
(e) Red phosphorus and an antimony-containing flame retardant
(f) Red phosphorus and a metal hydroxide
(g) Red phosphorus and a needle-shaped filler
(h) Red phosphorus, a phosphoric acid ester, and a phosphate-containing flame retardant
(i) Red phosphorus, a phosphoric acid ester, a phosphate-containing flame retardant, and a bromine-containing flame retardant
(j) Red phosphorus, a phosphoric acid ester, and a boron-containing flame retardant
(k) Red phosphorus, a phosphoric acid ester, and a needle-shaped filler
(l) Red phosphorus, a phosphate-containing flame retardant, and a bromine-containing flame retardant
(m) Red phosphorus, a phosphate-containing flame retardant, and a boron-containing flame retardant
(n) Red phosphorus, a bromine-containing flame retardant, and a boron-containing flame retardant
(n) Red phosphorus, a bromine-containing flame retardant, and a boron-containing flame retardant
(o) Red phosphorus, a phosphoric acid ester, a phosphate-containing flame retardant, and a bromine-containing flame retardant
(p) Red phosphorus, a phosphoric acid ester, a phosphate-containing flame retardant, a bromine-containing flame retardant, and a boron-containing flame retardant
(q) (l)-(p) to which a needle-shaped filler is further added
(r) Red phosphorus; a phosphoric acid ester and a phosphate-containing flame retardant; and at least one member selected from a boron-containing flame retardant, an antimony-containing flame retardant, metal hydroxide, and a needle-shaped filler
(s) Red phosphorus; one or two members selected from a phosphoric acid ester, a phosphate-containing flame retardant, and a bromine-containing flame retardant; at least one member selected from a boron-containing flame retardant, an antimony-containing flame retardant, metal hydroxide, and a needle-shaped filler
(t) Red phosphorus; phosphoric acid ester, a phosphate-containing flame retardant, and a bromine-containing flame retardant; at least one member selected from a boron-containing flame retardant, an antimony-containing flame retardant, metal hydroxide, and a needle-shaped filler There is no limitation to red phosphorus used in the present invention, and a commercially available product may be suitably selected for use.

The amount of the red phosphorus used in the in-situ foaming system is preferably within a range of 3.0 to 18 parts by weight, based on 100 parts by weight of the urethane resin.

The range of red phosphorus of 3.0 parts by weight or more maintains the self-extinguishing property of the flame-retardant urethane resin composition, while the range of 18 parts by weight or less does not prevent the foaming of the flame-retardant urethane resin composition.

The phosphoric acid ester used in the present invention is not particularly limited. It is preferable to use a monophosphoric acid ester, a condensed phosphoric acid ester, and the like.

Examples of monophosphoric acid esters include, but are not particularly limited to, trimethyl phosphate, triethyl phosphate, tributyl phosphate, tri(2-ethylhexyl)phosphate, tributoxyethyl phosphate, triphenyl phosphate, tricresyl phosphate, trixylenyl phosphate, tris(isopropylphenyl)phosphate, tris(phenylphenyl)phosphate, trinaphthyl phosphate, cresyl diphenyl phosphate, xylenyl diphenyl phosphate, diphenyl(2-ethylhexyl)phosphate, di(isopropylphenyl)phenyl phosphate, monoisodecyl phosphate, 2-acryloyloxyethyl acid phosphate, 2-methacryloyloxyethyl acid phosphate, diphenyl-2-acryloyloxyethyl phosphate, diphenyl-2-methacryloyloxyethyl phosphate, melamine phosphate, dimelamine phosphate, melamine pyrophosphate, triphenylphosphine oxide, tricresylphosphine oxide, diphenyl methanephosphonate, diethyl phenylphosphonate, resorcinol bis (diphenyl phosphate), bisphenol A bis(diphenyl phosphate), phospha phenanthrene, tris($\beta$-chloropropyl)phosphate, and the like.

Examples of condensed phosphoric acid esters include, but are not particularly limited to, trialkyl polyphosphate, resorcinol polyphenyl phosphate, resorcinol poly(di-2,6-xylyl)phosphate (produced by Daihachi Chemical Industry Co., Ltd., trade name: PX-200), hydroquinone poly(2,6-xylyl)phosphate, condensation products thereof, and like condensed phosphoric acid esters.

Examples of commercially available condensed phosphoric acid esters include resorcinol polyphenyl phosphate (trade name: CR-733S), bisphenol A polycresyl phosphate (trade name: CR-741), aromatic condensed phosphoric acid ester (trade name: CR747), resorcinol polyphenyl phosphate (produced by Adeka Co. Ltd., trade name: ADK Stab PFR), bisphenol A polycresyl phosphate (trade name: FP-600, FP-700), and the like.

Of the above, it is preferable to use a monophosphoric acid ester, and it is more preferable to use tris($\beta$-chloropropyl) phosphate, because they reduce the viscosity of the composition before being cured, as well as initial calorific value, in a highly sufficient manner.

The phosphoric acid esters may be used alone or in a combination of two or more.

The amount of phosphoric acid ester used is preferably within a range of 1.5 to 52 parts by weight, more preferably 1.5 to 20 parts by weight, still more preferably 2.0 to 15 parts by weight, and most preferably 2.0 to 10 parts by weight, based on 100 parts by weight of the urethane resin.

The range of phosphoric acid ester of 1.5 parts by weight or more prevents the breakage of dense residues that are formed when a molded product produced using the flame-retardant urethane resin composition is heated with fire. The range of 52 parts by weight or less does not hinder the foaming of flame-retardant urethane resin composition.

The phosphate-containing flame retardant used in the present invention contains a phosphoric acid. Examples of the phosphoric acid used in the phosphate-containing flame retardant include, but are not particularly limited to, various phosphoric acids, such as monophosphoric acid, pyrophosphoric acid, polyphosphoric acid, and combinations thereof.

Examples of phosphate-containing flame retardants include phosphates that are salts from various phosphoric acids with at least one metal or compound selected from metals belonging to Groups IA to IVB in the periodic table, ammonia, aliphatic amines, and aromatic amines. Examples of metals belonging to Groups IA to IVB in the periodic table include lithium, sodium, calcium, barium, iron (II), iron (III), aluminum, and the like.

Examples of aliphatic amines include methylamine, ethylamine, diethylamine, triethylamine, ethylenediamine, piperazine, and the like.

Examples of aromatic amines include pyridine, triazine, melamine, ammonium, and the like.

To improve the water resistance, the phosphate-containing flame retardant may be subjected to silane coupling agent treatment, covering with a melamine resin, or other known treatment. It is also possible to add a known foaming auxiliary agent, such as melamine or pentaerythritol.

Specific examples of phosphate-containing flame retardants include monophosphates, pyrophosphates, polyphosphates, and the like.

Examples of monophosphates include, but are not particularly limited to, ammonium salts, such as ammonium phosphate, ammonium dihydrogen phosphate, and diammonium hydrogen phosphate; sodium salts, such as monosodium phosphate, disodium phosphate, trisodium phosphate, monosodium phosphite, disodium phosphite, sodium hypophosphite; potassium salts, such as monopotassium phosphate, dipotassium phosphate, tripotassium phosphate, monopotassium phosphite, dipotassium phosphite, and potassium hypophosphorous; lithium salts, such as monolithium phosphate, dilithium phosphate, trilithium phosphate, monolithium phosphite, dilithium phosphite, and lithium hypophosphite; barium salts, such as barium dihydrogen phosphate, barium hydrogen phosphate, tribarium phosphate, and barium hypophosphite; magnesium salts, such as magnesium monohydrogen phosphate, magnesium hydrogen phosphate, trimagnesium phosphate, and magnesium hypophosphite; calcium salts, such as calcium dihydrogen phosphate, calcium hydrogen phosphate, tricalcium phosphate, and calcium hypophosphite; zinc salts, such as zinc phosphate, zinc phosphite, and zinc hypophosphite; and the like.

Examples of polyphosphates include, but are not particularly limited to, ammonium polyphosphate, piperazine polyphosphate, melamine polyphosphate, ammonium polyphosphate amide, aluminum polyphosphate, and the like.

Of these, it is preferable to use monophosphate, and it is more preferable to use ammonium dihydrogen phosphate, to improve the self-extinguishing property of the phosphate-containing flame retardant.

The phosphate-containing flame retardants may be used alone or in a combination of two or more.

The amount of the phosphate-containing flame retardant used in the present invention is preferably within a range of 1.5 to 52 parts by weight, more preferably 1.5 to 20 parts by weight, still more preferably 2.0 to 15 parts by weight, and most preferably 2.0 to 10 parts by weight, based on 100 parts by weight of the urethane resin.

The range of phosphate-containing flame retardant of 1.5 parts by weight or more maintains the self-extinguishing property of the flame-retardant urethane resin composition, while the range of 52 parts by weight or less does not inhibit the foaming of the flame-retardant urethane resin composition.

The bromine-containing flame retardant used in the present invention is not particularly limited, as long as it is a compound containing bromine in the molecular structure. Examples thereof include aromatic brominated compounds and the like.

Specific examples of aromatic brominated compounds include monomeric organic bromine compounds, such as hexabromobenzene, pentabromotoluene, hexabromobiphenyl, decabromodiphenyl, hexabromocyclodecane; decabromodiphenyl ether, octabromodiphenyl ether, hexabromodiphenyl ether, bis(pentabromophenoxy)ethane, ethylene-bis (tetrabromophthalimide), and tetrabromobisphenol A; brominated polycarbonates, such as polycarbonate oligomers produced by using brominated bisphenol A as a starting material, and copolymers of a polycarbonate oligomer with bisphenol A; brominated epoxy compounds, such as diepoxy compounds produced by a reaction between brominated bisphenol A and epichlorohydrin, and monoepoxy compounds obtained by a reaction between brominated phenols and epichlorohydrin; poly(brominated benzyl acrylate); brominated polyphenylene ether; condensation products of brominated bisphenol A, cyanuric chloride, and a brominated phenol; brominated polystyrenes, such as brominated (polystyrene), poly(brominated styrene), and crosslinked brominated polystyrene; and halogenated bromine compound polymers, such as crosslinked or non-crosslinked brominated poly(-methylstyrene).

It is preferable to use brominated polystyrene, hexabromobenzene, and the like, and it is more preferable to use hexabromobenzene, to control the calorific value at the initial stage of combustion.

The bromine-containing flame retardants may be used alone or in a combination of two or more.

The amount of the bromine-containing flame retardant used in the present invention is preferably within a range of 1.5 to 52 parts by weight, more preferably 1.5 to 20 parts by weight, still more preferably 2.0 to 15 parts by weight, and most preferably 2.0 to 10 parts by weight, based on 100 parts by weight of the urethane resin.

The range of the bromine-containing flame retardant of 0.1 parts by weight or more maintains the self-extinguishing property of the flame-retardant urethane resin composition, while the range of 52 parts by weight or less does not inhibit the foaming of flame-retardant urethane resin composition.

Examples of the boron-containing flame retardants used in the present invention include borax, boron oxides, boric acids, borates, and the like.

Examples of boron oxides include diboron trioxide, boron trioxide, diboron dioxide, tetraboron trioxide, tetraboron pentoxide, and the like.

Examples of borates include borates of alkali metals, alkaline earth metals, elements in Groups 4, 12, and 13 on the Periodic Table, ammonium, and the like.

Specific examples include alkali metal salt borates, such as lithium borate, sodium borate, potassium borate, and cesium borate; alkaline earth metal salt borates, such as magnesium borate, calcium borate, and barium borate; zirconium borate; zinc borate; aluminum borate; ammonium borate; and the like.

The boron-containing flame retardant used in the present invention, is preferably a borate, and more preferably zinc borate.

The boron-containing flame retardants may be used alone or in a combination of two or more. The amount of the boron-containing flame retardant used in the present invention is preferably within a range of 1.5 to 52 parts by weight, more preferably 1.5 to 20 parts by weight, still more preferably 2.0 to 15 parts by weight, and most preferably 2.0 to 10 parts by weight, based on 100 parts by weight of the urethane resin.

The range of the boron-containing flame retardant of 1.5 parts by weight or more maintains the self-extinguishing property of flame-retardant urethane resin composition, while the range of 52 parts by weight or less does not inhibit the foaming of the flame-retardant urethane resin composition.

Examples of the antimony-containing flame retardants used in the present invention include antimony oxides, antimonates, pyroantimonates, and the like.

Examples of antimony oxides include antimony trioxide, antimony pentoxide, and the like.

Examples of antimonates include sodium antimonate, potassium antimonate, and the like.

Examples of pyroantimonates include sodium pyroantimonate, potassium pyroantimonate, and the like.

The antimony-containing flame retardant used in the present invention is preferably an antimony oxide.

The antimony-containing flame retardants may be used alone or in a combination of two or more.

The amount of the antimony-containing flame retardant is preferably within a range of 1.5 to 52 parts by weight, more preferably 1.5 to 20 parts by weight, still more preferably 2.0 to 15 parts by weight, and most preferably 2.0 to 10 parts by weight, based on 100 parts by weight of the urethane resin.

The range of the antimony-containing flame retardant of 1.5 parts by weight or more maintains the self-extinguishing property of the flame-retardant urethane resin composition, while the range of 52 parts by weight or less does not inhibit the foaming of flame-retardant urethane resin composition.

Examples of metal hydroxides used in the present invention include magnesium hydroxide, calcium hydroxide, aluminum hydroxide, iron hydroxide, nickel hydroxide, zirconium hydroxide, titanium hydroxide, zinc hydroxide, copper hydroxide, vanadium hydroxide, tin hydroxide, and the like.

The metal hydroxides may be used alone or in a combination of two or more.

The amount of the metal hydroxide used is preferably within a range of 1.5 to 52 parts by weight, more preferably 1.5 to 20 parts by weight, still more preferably 2.0 to 15 parts by weight, and most preferably 2.0 to 10 parts by weight, based on 100 parts by weight of the urethane resin.

The range of the metal hydroxide of 1.5 parts by weight or more maintains the self-extinguishing property of the flame-retardant urethane resin composition, while the range of 52 parts by weight or less does not inhibit the foaming of the flame-retardant urethane resin composition.

Examples of the needle-shaped fillers used in the present invention include potassium titanate whisker, aluminum borate whisker, magnesium-containing whisker, silicon-containing whisker, wollastonite, sepiolite, zonolite, ellestadite, boehmite, cylindrical hydroxyapatite, glass fibers, asbestos fibers, carbon fibers, graphite fibers, metal fibers, slag fibers, gypsum fibers, silica fibers, alumina fibers, silica-alumina fibers, zirconia fibers, boron nitride fibers, boron fibers, stainless steel fibers, and the like.

The aspect ratio (length/diameter) of the needle-shaped filler used in the present invention is preferably within a range of 5 to 50, and more preferably 10 to 40.

The needle-shaped fillers may be used alone or in a combination of two or more.

The amount of the needle-shaped filler used in the present invention is not particularly limited. It is preferably within a range of 3.0 to 30 parts by weight, more preferably 3.0 to 20 parts by weight, still more preferably 3.0 to 18 parts by weight, and most preferably 6.0 to 18 parts by weight, based on 100 parts by weight of the urethane resin.

The range of the needle-shaped filler of 3.0 parts by weight or more maintains the shape of the flame-retardant heat-insulating material composition of the present invention after combustion, while the range of 30 parts by weight or less does not inhibit the foaming of the flame-retardant heat-insulating material composition of the present invention.

The amount of the additives used in the present invention is preferably within a range of 4.5 to 70 parts by weight, more preferably 4.5 to 40 parts by weight, still more preferably 4.5 to 30 parts by weight, and most preferably 4.5 to 20 parts by weight, based on 100 parts by weight of the urethane resin.

The range of the additives of 4.5 parts by weight or more prevents the breakage of dense residues formed when a molded product produced using the flame-retardant urethane resin composition is heated with fire. The range of 70 parts by weight or less does not inhibit the foaming of flame-retardant urethane resin composition.

In a preferable embodiment, the in-situ foaming system comprises the trimerization catalyst (C) in an amount within a range of 0.1 to 10 parts by weight, the foaming agent (D) within a range of 0.1 to 30 parts by weight, the foam stabilizer (E) within a range of 0.1 to 10 parts by weight, the additives (F) within a range of 4.5 to 70 parts by weight, the red phosphorus within a range of 3 to 18 parts by weight, and at least one additive other than the red phosphorus within a range of 1.5 to 52 parts by weight, based on 100 parts by weight of the polyurethane resin composition comprising the polyisocyanate (A) of the first liquid and the polyol (B) of the second liquid.

(G) Other Components

The in-situ foaming system may further contain a catalyst other than the trimerization catalyst mentioned above. Examples of such catalysts include nitrogen-containing catalysts, such as triethylamine, N-methylmorpholine bis(2-dimethylaminoethyl)ether, N,N,N',N'',N''-pentamethyldiethylenetriamine, N,N,N'-trimethylaminoethyl-ethanolamine, bis(2-dimethylaminoethyl)ether, N-methyl, N'-dimethylaminoethyl piperazine, imidazole compounds in which a secondary amine functional group in the imidazole ring is replaced with a cyanoethyl group; and the like.

The amount of the catalysts, as a total amount of the trimerization catalyst and a catalyst other than the trimerization catalyst, is preferably within a range of 0.1 to 10 parts by weight, more preferably 0.1 to 8 parts by weight, still more preferably 0.1 to 6 parts by weight, and most preferably 0.1 to 3.0 parts by weight, based on 100 parts by weight of the urethane resin.

The range of 0.1 parts by weight or more does not inhibit the urethane bond formation, while the range of 10 parts by weight or less maintains an appropriate foaming rate, enabling easy handling.

The in-situ foaming system may further contain an antisettling agent. Examples of antisettling agents include, but are not particularly limited to, carbon black, silica fine powder, hydrogenated castor oil wax, fatty acid amide wax, organic clay, polyethylene oxide, and the like.

The in-situ foaming system may further contain an inorganic filler. Examples of inorganic fillers include, but are not particularly limited to, silica, diatomaceous earth, alumina, titanium oxide, calcium oxide, magnesium oxide, iron oxide, tin oxide, antimony oxide, ferrites, basic magnesium carbonate, calcium carbonate, magnesium carbonate, zinc carbonate, barium carbonate, dawsonite, hydrotalcite, calcium sulfate, barium sulfate, gypsum fiber, calcium silicate and like potassium salts, talc, clay, mica, montmorillonite, bentonite, activated white clay, sepiolite, imogolite, sericite, glass fibers, glass beads, silica balloon, aluminum nitride, boron nitride, silicon nitride, carbon black, graphite, carbon fibers, carbon balloon, charcoal powder, various metal powders, potassium titanate, magnesium sulfate, lead zirconate titanate, aluminum borate, molybdenum sulfide, silicon carbide, stainless steel fibers, various magnetic powders, slag fibers, fly ash, silica alumina fibers, alumina fibers, silica fibers, zirconia fibers, and the like.

The inorganic fillers may be used alone or in a combination of two or more.

As long as the object of the present invention is achieved, the in-situ foaming system may further optionally contain an antioxidant, based on phenol, amine, sulfur, or the like, a heat stabilizer, a metal deterioration inhibitor, an antistatic agent, a stabilizer, a crosslinking agent, a lubricant, a softening agent, a pigment, a tackifier resin, and like auxiliary components; a polybutene, a petroleum resin and like a tackifier.

In-Situ Foaming System, Flame-Retardant Urethane Resin Composition, and Flame-Retardant Polyurethane Foam When the above components (A) to (F) are mixed, the flame-retardant urethane resin composition is cured by a reaction; thus, its viscosity changes over time. Therefore, the flame-retardant urethane resin composition is separated into two or more portions as the in-situ foaming system of the present invention before use so as to prevent the flame-retardant urethane resin composition from being cured by a reaction. At the time of use of the flame-retardant urethane resin composition, the flame-retardant urethane resin composition that was separated into two or more portions is brought together. In this manner, the flame-retardant urethane resin composition is obtained.

The flame-retardant urethane resin composition may be separated into two or more portions in such a manner that the components of each portion do not start curing independently, and the curing reaction starts after the separated components of the flame-retardant urethane resin composition are mixed together.

The flame-retardant urethane resin composition may be mixed and cured at an ordinary temperature. It is also possible to heat each component in advance.

The trimerization catalyst (C), the foaming agent (D), the foam stabilizer (E), and the additives (F) may each be contained in either of the first liquid or the second liquid, or may be provided as a third liquid or a liquid subsequent to the third liquid, which is different from the first or second liquid. It is preferable that the trimerization catalyst (C), the foaming agent (D), the foam stabilizer (E), and the additives (F) be mixed within the second liquid. The other components (G) may also be contained in either of the first liquid or the second liquid, or may be provided as a third liquid or a liquid subsequent to the third liquid, which is different from the first or second liquid. The other components (G) are preferably mixed within the second liquid.

Figure 1:
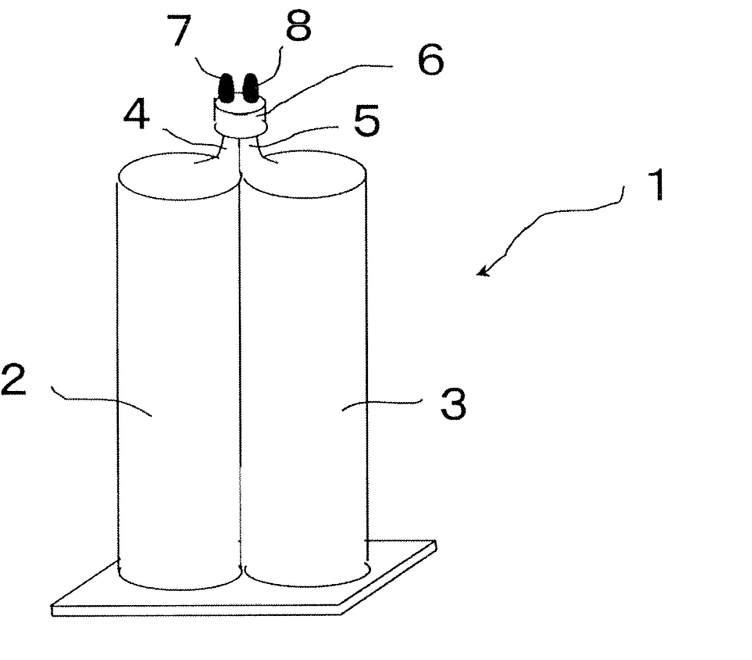
FIG. 1 shows a schematic diagram illustrating a two-liquid mixing vessel embodying the in-situ foaming system of the present invention.

FIG. 1 is a schematic diagram illustrating a two-liquid mixing vessel embodying the in-situ foaming system of the present invention. A two-liquid mixing vessel 1 includes hollow, generally cylindrical first container 2 and second container 3, which are attached to each other at their side surfaces. A discharge path 4 and a discharge path 5 are respectively provided at the tips of the first container 2 and the second container 3. The discharge path 4 and the discharge path 5 are united by a lid 6. For example, the first container 2 is made to contain the first liquid containing the polyisocyanate while the second container 3 is made to contain the second liquid containing the polyol. Then, at the time of use, caps 7 and 8 are removed, a static mixer is attached to the tips of the two-liquid mixing vessel 1 while a cartridge gun is attached to the ends of the two-liquid mixing vessel 1, and the two liquids in the containers are mixed with the static mixer and discharged.

FIG. 1 shows a two-liquid mixing vessel in which the first liquid and the second liquid are separately contained in generally cylindrical containers embodying the in-situ foaming system. However, it is also possible to use a two-liquid mixing vessel in which the first liquid and the second liquid are contained in one container. The mixing vessel, and a stirrer, a cartridge gun, discharge apparatus, and the like that are used together with the mixing vessel may be ones that are known.

The flame-retardant urethane resin composition generated after the two liquids are mixed and discharged is foamed and cured to be a flame-retardant polyurethane foam. The present invention also encompasses a flame-retardant polyurethane foam formed from the flame-retardant urethane resin composition containing the components described above.

The usage of the flame-retardant urethane resin composition and the flame-retardant polyurethane foam is not particularly limited. They are usually used for repairing a foam used in a heat-insulating material for vehicles or buildings, or for filling up an opening or gap of buildings. The term "building" as used herein includes any structures constructing buildings, such as building structural materials for walls, ceilings, roofs, and floors, as well as fittings, such as windows (e.g., a double sliding window, a casement window, a double hung window), shoji (a Japanese sliding window or door), tobira (i.e. a door), to (a Japanese door), fusuma (a Japanese sliding door), and a transom. The "opening" refers to any openings found in a building, including joints between the structural materials of a building and holes in one structural material. Among openings, a "gap" refers to an opening found between two oppositely facing components or portions, such as between a structural material and a structural material, between a structural material and a fitting, between a fitting and a fitting, between a structural material or a fitting and furniture (e.g., a kitchen sink).

In addition to the direct use of the flame-retardant urethane resin composition to fill up an opening or a gap of a building, the composition may be poured into a mold etc. to be formed into dimensions (length, width, and thickness) to fit an opening or a gap of a building, or may be discharged from a mixing vessel to somewhere different and cut to predetermined dimensions (length, width, and thickness) as a flame-retardant polyurethane foam, which may then be applied to an opening or gap of a building.

The flame-retardant polyurethane foam obtained by foam-curing the flame-retardant urethane resin composition is a polyisocyanurate foam and has an excellent waterproof property, excellent airtightness, and excellent fire resistance; thus, penetration of, for example, water, smoke, flames, and combustion-generated gas from openings or gaps of a building is effectively blocked.

Exothermic Test

The flame-retardant polyurethane foam comprising the flame-retardant urethane resin composition is cut into a piece with a length of 10 cm, a width of 10 cm, and a thickness of 5 cm. In this manner, a sample for a cone calorimeter test is prepared.

Using the sample for a cone calorimeter test, and based on the test method of ISO-5660, a gross calorific value is measured by a cone calorimeter test by heating the sample for 20 minutes at a radiant heat intensity of 50 kW/m².

The present invention is described below in more detail with reference to Examples. However, the present invention is not limited to these Examples.

EXAMPLES

Example 1

Evaluation of Flame-Retardant Polyurethane Foam

Following the formulations shown in Tables 1 and 2, the components of each of the flame-retardant polyurethane resin compositions of Examples 1 to 26 and Comparative Examples 1 to 12 were separated into two component portions, i.e., (1) a polyisocyanate and (2) a polyol composition. The following are the details of each component in the tables.

Commercially available flame-retardant polyurethane compositions for forming a flame-retardant polyurethane foam were used in Comparative Example 12 (produced by Siroflex Inc., product name: SX Flameguard (registered trademark) B1 fire retardant foam, composition: polyurethane resin) and in Comparative Example 13 (produced by ABC Trading Co., Ltd., product name: Insulpak GS flame-retardant B1 foam, composition: polyurethane resin).

(1) Polyisocyanate
MDI (produced by Tosoh Corporation, product name: Millionate MR-200), viscosity: 167 mPa·s (2) Polyol composition
 Polyol compound
(I-1) p-phthalic acid polyester polyol (produced by Kawasaki Kasei Chemicals Ltd., product name: Maximol RFK-505, hydroxyl value=250 mg KOH/g)
(I-2) p-phthalic acid polyester polyol (produced by Kawasaki Kasei Chemicals Ltd., product name: Maximol RLK-087, hydroxyl value=200 mg KOH/g)
(I-3) p-phthalic acid polyester polyol (produced by Kawasaki Kasei Chemicals Ltd., product name: Maximol RLK-035, hydroxyl value=150 mg KOH/g)
(I-4) Polyether polyol (produced by Mitsui Chemicals, Inc., product name: Actcall T-400, hydroxyl value: 399 mg KOH/g)
 Catalyst
(II-1) Potassium octylate (produced by Tokyo Chemical Industry Co., Ltd., product code: P0048)
(II-2) Trimerization catalyst (produced by Tosoh Corporation, product name: TOYOCAT-TR20)
(II-3) Trimerization catalyst (produced by Kao Corporation, product name: Kaolizer No. 14)
(II-4) Trimerization catalyst (produced by Kao Corporation, product name: Kaolizer No. 410)
 Urethanization catalyst
(II-6) Pentamethyldiethylenetriamine (produced by Tosoh Corporation, product name: TOYOCAT-DT)
 Foam stabilizer
Polyalkylene glycol-based foam stabilizer (produced by Dow Corning Toray Co., Ltd., product name: SH-193)
 Foaming agent
(III-1) Water
(III-2) HFC HFC-365mfc (1,1,1,3,3-pentafluorobutane, produced by Solvay Japan, Ltd.) and HFC-245fa (1,1,1,3,3-pentafluoropropane, produced by Central Glass Co., Ltd.), mixed ratio: HFC-365mfc:HFC-245fa=7:3, hereinafter referred to as "HFC" (III-3) HFO (produced by Honeywell Japan Inc., E-1-chloro-3,3,3,-trifluoropentene, product name: Solstice LBA)
 Additives
(IV-1) Red phosphorus (produced by Rin Kagaku Kogyo Co., Ltd., product name: Nova Excel 140)
(IV-2) Tris(β-chloropropyl)phosphate (produced by Daihachi Chemical Industry Co., Ltd., product name: TMCPP, hereinafter referred to as "TMCPP")
(IV-3) Ammonium dihydrogen phosphate (produced by Taihei Chemical Industrial Co., Ltd.)
(IV-4) Hexabromobenzene (produced by Manac Incorporated, product name: HBB-b, hereinafter referred to as "HBB")
(IV-5) Zinc borate (produced by Hayakawa & Co., Ltd., product name: Firebrake ZB)
(IV-6) Antimony trioxide (produced by Nihon Seiko Co., Ltd., product name: Patox C)
(IV-7) Aluminum hydroxide (produced by Almorix Ltd., product name: B-325)
(IV-8) Needle-shaped filler (produced by Kinsei Matec Co. Ltd., wollastonite, product name: SH1250, particle size: 4.5 to 6.5 μm, aspect ratio: 10 to 20)

Following the formulations shown in Tables 1 and 2, the components of (1) a polyol, (2) a catalyst, (3) a foam stabilizer, (4) a foaming agent, and (5) additives were weighed into a 1000-mL polypropylene beaker, and the mixture was stirred at 25° C. at 400 rpm for 1 minute using a three-one motor (produced by Shinto Scientific Co., Ltd., product name: BLW1200).

The stirred polyol composition and a polyisocyanate were separately weighed into a two-liquid mixing vessel to obtain an in-situ foaming system. Then, the polyol composition and polyisocyanate were mixed using a static mixer attached to the tips of the two-liquid mixing vessel and discharged to a 1000-mL polypropylene beaker using a cartridge gun. In this manner, a foam was obtained.

The foam was evaluated according to the following criteria. Tables 1 and 2 show the results.

Measurement of Calorific Value

The cured product was cut to a size of 10 cm×10 cm×5 cm to obtain a sample for a cone calorimeter test, and based on ISO-5660, the gross calorific value was measured with heating at a radiant heat intensity of 50 kW/m² for 10 minutes and 20 minutes. Tables 1 and 2 show the results.

This measuring method is specified by the General Building Research Corporation of Japan, which is a public institution stipulated in Article 108 (2) of the Enforcement Ordinance of Building Standards Act, as a test method that corresponds to the standard of a cone calorimeter method. The measuring method is based on the test method of ISO-5660.

Measurement of Expansion

In the test of ISO-5660, when the molded article after heating came into contact with the igniter, "Poor" was given, and when it did not come into contact, "Good" was given, as shown in Tables 1 and 2.

Measurement of Deformation (Cracking)

In the test of ISO-5660, when a deformation reached the back of the test sample, "Poor" was given, and when no deformation that observed at the back of the test sample, "Good" was given, as shown in Tables 1 and 2.

Measurement of Shrinkage

In the test of ISO-5660, when a deformation of 1 cm or more in the width direction and 5 mm or more in the thickness direction of the test sample was observed, "Poor" was given, and when no deformation was observed, "Good" was given, as shown in Tables 1 and 2.

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|
| Polyisocyanate | I-1 | 78.2 | 78.2 | 78.2 | 78.2 | 78.2 | 78.2 | 78.2 | 78.2 | 78.2 | 78.2 | 78.2 | 78.2 | 78.2 |
| Polyol | I-2 | 21.8 | 21.8 | 21.8 | 21.8 | 21.8 | 21.8 | 21.8 | 21.8 | 21.8 | 21.8 | 21.8 | 21.8 | 21.8 |
| | I-3 | | | | | | | | | | | | | |
| | I-4 | | | | | | | | | | | | | |
| Catalyst Trimerization catalyst | II-1 | 0.5 | 0.5 | 0.5 | 0.5 | 0.5 | 0.5 | 0.5 | 0.5 | 0.5 | 0.5 | 0.5 | 0.5 | 0.5 |
| | II-2 | 0.7 | 0.7 | 0.7 | 0.7 | 0.7 | 0.7 | 0.7 | 0.7 | 0.7 | 0.7 | 0.7 | 0.7 | 0.7 |
| | II-3 | | | | | | | | | | | | | |
| | II-4 | | | | | | | | | | | | | |
| Urethanization catalyst | II-6 | 0.1 | 0.1 | 0.1 | 0.1 | 0.1 | 0.1 | 0.1 | 0.1 | 0.1 | 0.1 | 0.1 | 0.1 | 0.1 |
| Foam stabilizer | III-1 | 1.7 | 1.7 | 1.7 | 1.7 | 1.7 | 1.7 | 1.7 | 1.7 | 1.7 | 1.7 | 1.7 | 1.7 | 1.7 |
| | III-2 | 0.6 | 0.6 | 0.6 | 0.6 | 0.6 | 0.6 | 0.6 | 0.6 | 0.6 | 0.6 | 0.6 | 0.6 | |
| | III-3 | 4.6 | 4.6 | 4.6 | 4.6 | 4.6 | 4.6 | 4.6 | 4.6 | 4.6 | 4.6 | 4.6 | 15.0 | 10.0 |
| Foaming agent | IV-1 | 6.0 | 3.2 | 12.6 | 16.0 | 6.0 | 6.0 | 6.0 | 9.0 | 9.0 | 9.0 | 9.0 | 6.0 | 6.0 |
| | IV-2 | 7.0 | 3.6 | 14.8 | 18.0 | 7.0 | 7.0 | 7.0 | | 7.0 | 7.0 | 7.0 | 7.0 | 7.0 |
| | IV-3 | 3.0 | 1.6 | 6.3 | 8.0 | 3.0 | 3.0 | 3.0 | | | | | 3.0 | 3.0 |
| | IV-4 | 3.0 | 1.6 | 6.3 | 8.0 | 3.0 | 3.0 | 3.0 | | | | | 3.0 | 3.0 |
| | IV-5 | | | | | 6.0 | | | | | | | | |
| | IV-6 | | | | | | 6.0 | | | | | | | |
| | IV-7 | | | | | | | 6.0 | | | | | | |
| | IV-8 | | | | | | | | | | | | | |
| Antisettling agent | | | | | | | | | 9.0 | 3.0 | 9.0 | 18.0 | | |
| Density (kg/m²) | | 0.055 | 0.054 | 0.056 | 0.059 | 0.057 | 0.055 | 0.054 | 0.050 | 0.050 | 0.053 | 0.058 | 0.032 | 0.081 |
| Index (NCO/OH) | | 365 | 365 | 365 | 365 | 365 | 365 | 365 | 365 | 365 | 365 | 365 | 365 | 365 |
| Gross calorific value | After 10 min. | 2.0 | 3.7 | 3.9 | 5.6 | 5.8 | 5.2 | 3.6 | 7.1 | 2.5 | 2.5 | 3.6 | 3.9 | 4.2 |
| | After 20 min. | 4.2 | 7.0 | 7.6 | 7.7 | 7.5 | 6.8 | 4.8 | 9.1 | 4.9 | 4.3 | 5.8 | 6.7 | 6.9 |
| Residue state | Expansion | Good | Good | Good | Good | Good | Good | Good | Good | Good | Good | Good | Good | Good |
| | Deformation | Good | Good | Good | Good | Good | Good | Good | Good | Good | Good | Good | Good | Good |
| | Shrinkage | Good | Good | Good | Good | Good | Good | Good | Good | Good | Good | Good | Good | Good |

| | | Ex. 14 | Ex. 15 | Ex. 16 | Ex. 17 | Ex. 18 | Ex. 19 | Ex. 20 | Ex. 21 | Ex. 22 | Ex. 23 | Ex. 24 | Ex. 25 | Ex. 26 |
|---|---|---|---|---|---|---|---|---|---|---|---|---|---|---|
| Isocyanate | I-1 | 78.2 | 78.2 | 74.7 | 69.9 | 84.5 | 62.1 | 89.2 | 78.2 | 78.2 | 78.2 | 78.2 | 78.2 | 78.2 |
| Polyol | I-2 | 21.8 | 21.8 | 25.3 | | 15.5 | 37.9 | 10.8 | 21.8 | 21.8 | 21.8 | 21.8 | 21.8 | 21.8 |
| | I-3 | | | | 30.1 | | | | | | | | | |
| | I-4 | | | | | | | | | | | | | |
| Catalyst Trimerization catalyst | II-1 | 0.5 | 0.5 | 0.5 | 0.5 | 0.5 | 0.5 | 0.5 | | 0.2 | 0.5 | 0.5 | | 0.7 |
| | II-2 | 0.7 | 0.7 | 0.7 | 0.7 | 0.7 | 0.7 | 0.7 | 0.2 | 0.2 | 0.7 | | 1.5 | 1.5 |
| | II-3 | | | | | | | | | | | 0.7 | | |
| | II-4 | | | | | | | | | | | | | |
| Urethanization catalyst | II-6 | 0.1 | 0.1 | 0.1 | 0.1 | 0.1 | 0.1 | 0.1 | 0.1 | 0.1 | 0.1 | 0.1 | 0.1 | 0.1 |
| Foam stabilizer | III-1 | 1.7 | | 1.7 | 1.7 | 1.7 | 1.7 | 1.7 | 1.7 | 1.7 | 1.7 | 1.7 | 1.7 | 1.7 |
| | III-2 | | 0.5 | 0.6 | 0.6 | 0.6 | 0.6 | 0.6 | 0.6 | 0.6 | 0.6 | 0.6 | 0.6 | 0.6 |
| | III-3 | 1.0 | | 4.6 | 4.6 | 4.6 | 4.6 | 4.6 | 4.6 | 4.6 | 4.6 | 4.6 | 4.6 | 4.6 |
| | | | 10.0 | | | | | | | | | | | |
| Flame retardant | V-1 | 6.0 | 6.0 | 6.0 | 6.0 | 6.0 | 6.0 | 6.0 | 6.0 | 6.0 | 6.0 | 6.0 | 6.0 | 6.0 |
| | V-2 | 7.0 | 7.0 | 7.0 | 7.0 | 7.0 | 7.0 | 7.0 | 7.0 | 7.0 | 7.0 | 7.0 | 7.0 | 7.0 |

TABLE 1-continued

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 | Comp. Ex. 12 | Comp. Ex. 13 |
|---|---|---|---|---|---|---|---|---|---|---|---|---|---|---|
| Antisettling agent | IV-3 |  |  |  |  |  |  |  |  |  |  |  |  |  |
|  | IV-4 |  |  |  |  |  |  |  |  |  |  |  |  |  |
|  | IV-5 |  |  |  |  |  |  |  |  |  |  |  |  |  |
|  | IV-6 |  |  |  |  |  |  |  |  |  |  |  |  |  |
|  | IV-7 | 3.0 | 3.0 | 3.0 | 3.0 | 3.0 | 3.0 | 3.0 | 3.0 | 3.0 | 3.0 | 3.0 | 3.0 | 3.0 |
|  | IV-8 | 3.0 | 3.0 | 3.0 | 3.0 | 3.0 | 3.0 | 3.0 | 3.0 | 3.0 | 3.0 | 3.0 | 3.0 | 3.0 |
| Density (kg/m²) |  | 0.056 | 0.043 | 0.053 | 0.053 | 0.060 | 0.052 | 0.053 | 0.055 | 0.053 | 0.055 | 0.051 | 0.055 | 0.051 |
| Index (NCO/OH) |  | 365 | 365 | 365 | 365 | 365 | 365 | 365 | 200 | 600 | 365 | 365 | 365 | 365 |
| Gross calorific value | After 10 min. | 2.5 | 2.3 | 3.4 | 17.3 | 12.0 | 9.6 | 3.8 | 4.7 | 7.1 | 3.9 | 3.0 | 2.8 | 3.2 | 4.6 |
|  | After 20 min. | 4.1 | 4.4 | 5.9 | 26.5 | 15.6 | 13.5 | 5.5 | 7.1 | 10.3 | 6.5 | 4.6 | 4.2 | 5.1 | 5.8 |
| Residue state | Expansion | Good | Good | Good | Good | Poor | Poor | Good | Good | Good | Good | Good | Good | Good | Good |
|  | Deformation | Good | Good | Good | Poor | Poor | Poor | Good | Good | Good | Good | Good | Good | Good | Good |
|  | Shrinkage | Good | Good | Good | Poor | Good | Poor | Good | Good | Good | Good | Good | Good | Good | Good |

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 | Comp. Ex. 12 | Comp. Ex. 13 |
|---|---|---|---|---|---|---|---|---|---|---|---|---|---|---|
| Isocyanate |  | 47.7 | 78.2 | 78.2 | 78.2 | 78.2 | 78.2 | 68.6 | 78.2 | 78.2 | 78.2 | 78.2 | Commercially available product | Commercially available product | Commercially available product |
| Polyol |  | 52.3 | 21.8 | 21.8 | 21.8 | 21.8 | 21.8 | 31.4 | 21.8 | 21.8 | 21.8 | 21.8 |  |  |  |
| Catalyst | Trimerization catalyst I-1 | 0.5 | 0.5 | 0.5 | 0.5 | 0.5 | 0.5 | 0.5 | 0.5 | 0.5 | 0.5 | 0.5 |  |  |  |
|  | I-2 | 0.7 | 0.7 | 0.7 | 0.7 | 0.7 | 0.7 | 0.7 | 0.7 | 0.7 | 0.7 | 0.7 |  |  |  |
|  | I-3 |  |  |  |  |  |  |  |  |  |  |  |  |  |  |
|  | I-4 |  |  |  |  |  |  |  |  |  |  |  |  |  |  |
|  | I-5 |  |  |  |  |  |  |  |  |  |  |  |  |  |  |
|  | Urethanization catalyst II-1 | 0.1 | 0.1 | 0.1 | 0.1 | 0.1 | 0.1 | 0.1 | 0.1 | 0.1 | 0.1 | 0.1 |  |  |  |
|  | II-2 | 1.7 | 1.7 | 1.7 | 1.7 | 1.7 | 1.7 | 1.7 | 1.7 | 1.7 | 1.7 | 1.7 |  |  |  |
|  | II-3 | 0.6 | 0.6 | 0.6 | 0.6 | 0.6 | 0.6 |  | 0.6 | 0.6 | 0.6 | 0.6 |  |  |  |
|  | II-4 | 4.6 | 4.6 | 4.6 | 4.6 | 4.6 | 4.6 |  | 4.6 | 4.6 | 4.6 | 4.6 |  |  |  |
|  | II-6 |  |  |  |  |  |  |  |  |  |  |  |  |  |  |
| Foam stabilizer | III-1 |  |  | 6.0 | 24.0 | 1.6 |  | 6.0 | 2.3 | 24.0 |  | 2.0 |  |  |  |
|  | III-2 |  |  |  |  | 1.8 |  | 7.0 | 2.7 | 20.0 |  |  |  |  |  |
|  | III-3 |  |  |  |  | 0.8 |  | 3.0 |  |  |  |  |  |  |  |
| Foaming agent | IV-1 |  |  |  |  | 0.8 |  | 3.0 |  |  |  |  |  |  |  |
|  | IV-2 |  |  |  |  |  | 7.0 |  |  |  |  |  |  |  |  |
|  | IV-3 |  |  |  |  |  | 3.0 |  |  |  |  |  |  |  |  |
|  | IV-4 |  |  |  |  |  | 3.0 |  |  |  |  |  |  |  |  |
|  | IV-5 |  |  |  |  |  |  |  |  |  | 1.0 | 1.0 |  |  |  |
|  | IV-6 |  |  |  |  |  |  |  |  |  |  |  |  |  |  |
|  | IV-7 |  |  |  |  |  |  |  |  |  |  |  |  |  |  |
|  | IV-8 |  |  |  |  |  |  |  |  |  |  |  |  |  |  |
| Flame retardant |  |  |  |  |  |  |  |  |  |  |  |  |  |  |  |
| Antisettling agent |  |  |  |  |  |  |  |  |  |  |  |  |  |  |  |
| Density (kg/m²) |  | 0.057 | 0.058 | 0.053 | 0.060 | 0.052 | 0.053 | 0.314 | 0.055 | 0.052 | 0.056 | 0.058 | 0.040 | 0.055 | 0.038 |
| Index (NCO/OH) |  | 120 | 365 | 365 | 365 | 365 | 365 | 365 | 365 | 365 | 365 | 365 | unknown | unknown | unknown |
| Gross calorific value | After 10 min. | 36.8 | 30.3 | 8.3 | 17.3 | 12.0 | 9.6 | 25.9 | 10.5 | 14.5 | 12.1 | 13.6 | 24.3 | — | 28.9 |
|  | After 20 min. | 53.6 | 49.6 | 11.6 | 26.5 | 15.6 | 13.5 | 34.0 | 13.9 | 19.1 | 15.0 | 16.0 | 40.7 | — | 43.8 |
| Residue state | Expansion | — | Poor | Poor | Good | Poor | Poor | Good | Poor | Good | Good | Good | Poor | Poor | Poor |
|  | Deformation | Poor | Poor | Good | Poor | Poor | Poor | Good | Poor | Good | Poor | Good | Poor | Poor | Poor |
|  | Shrinkage | Poor | Poor | Poor | Poor | Good | Poor | Good | Good | Poor | Poor | Poor | Poor | Poor | Poor |

The invention claimed is:

1. The flame-retardant polyurethane foam being formed from a flame-retardant polyurethane resin composition comprising:
   a polyisocyanate (A),
   a polyol (B),
   a trimerization catalyst (C),
   a foaming agent (D),
   a foam stabilizer (E), and
   additives (F),
   wherein the additives (F) comprise red phosphorus, phosphoric acid esters, and at least one member selected from the group consisting of bromine-containing flame retardants, boron-containing flame retardants, antimony-containing flame retardants, metal hydroxides and needle-shaped fillers, and
   wherein the gross calorific value measured with heating a sample of the polyurethane foam at a radiant heat intensity of 50 kW/m$^2$ for 10 minutes for a cone calorimeter test based on ISO-5660 is not less than 2 MJ/m$^2$ and not more than 7.1 MJ/m$^2$.

2. The flame-retardant polyurethane foam being formed from a flame-retardant polyurethane resin composition comprising:
   a polyisocyanate (A),
   a polyol (B),
   a trimerization catalyst (C),
   a foaming agent (D),
   a foam stabilizer (E), and
   additives (F),
   wherein the additives (F) comprise red phosphorous, phosphoric acid esters, and at least one member selected from the group consisting of bromine-containing flame retardants, boron-containing flame retardants, antimony-containing flame retardants, metal hydroxides and needle-shaped fillers, and
   wherein the gross calorific value measured with heating a sample of the polyurethane foam at a radiant heat intensity of 50 kW/m$^2$ for 20 minutes for a cone calorimeter test based on ISO-5660 is not less than 4.1 MJ/m$^2$ and not more than 10.3 MJ/m$^2$.

3. The flame-retardant polyurethane foam according to claim 1, wherein
   the trimerization catalyst (C) is contained within a range of 0.1 to 10 parts by weight,
   the foaming agent (D) is contained within a range of 0.1 to 30 parts by weight,
   the foam stabilizer (E) is contained within a range of 0.1 to 10 parts by weight,
   the additives (F) is contained within a range of 4.5 to 70 parts by weight,
   the red phosphorus is contained within a range of 3 to 18 parts by weight, and
   a total of the phosphoric acid esters and the at least one member selected from the group consisting of bromine-containing flame retardants, boron-containing flame retardants, antimony-containing flame retardants, metal hydroxides and needle-shaped fillers is contained within a range of 1.5 to 52 parts by weight, based on 100 parts by weight of a total of the polyisocyanate (A) and the polyol (B).

4. The flame-retardant polyurethane foam according to claim 2, wherein
   the trimerization catalyst (C) is contained within a range of 0.1 to 10 parts by weight,
   the foaming agent (D) is contained within a range of 0.1 to 30 parts by weight,
   the foam stabilizer (E) is contained within a range of 0.1 to 10 parts by weight,
   the additives (F) is contained within a range of 4.5 to 70 parts by weight,
   the red phosphorus is contained within a range of 3 to 18 parts by weight, and
   a total of the phosphoric acid esters and the at least one member selected from the group consisting of bromine-containing flame retardants, boron-containing flame retardants, antimony-containing flame retardants, metal hydroxides and needle-shaped fillers is contained within a range of 1.5 to 52 parts by weight, based on 100 parts by weight of a total of the polyisocyanate (A) and the polyol (B).

5. A method of heat-insulating vehicles or buildings comprising applying the flame-retardant polyurethane foam of claim 1 to vehicle or buildings.

6. A method of heat-insulating vehicles or buildings comprising applying the flame-retardant polyurethane foam of claim 2 to vehicle or buildings.

* * * * *